No. 690,429. Patented Jan. 7, 1902.
A. H. HOPKINS.
COFFEE HULLING MACHINE.
(Application filed Sept. 7, 1900.)
(No Model.) 2 Sheets—Sheet 1.

Witnesses:

Inventor
Adolphe H Hopkins
by Eugene Cousou
Att'y

No. 690,429. Patented Jan. 7, 1902.
A. H. HOPKINS.
COFFEE HULLING MACHINE.
(Application filed Sept. 7, 1900.)
(No Model.) 2 Sheets—Sheet 2.
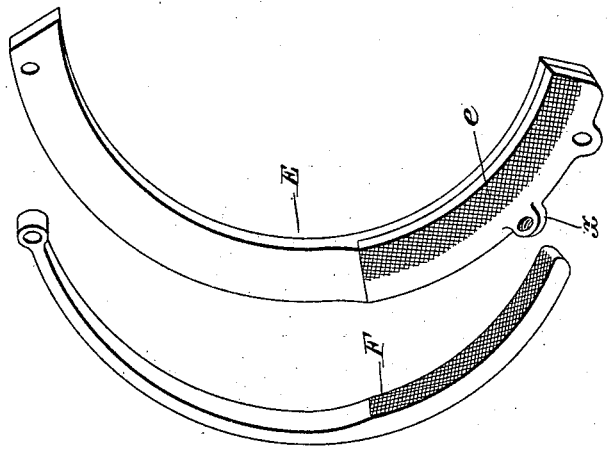
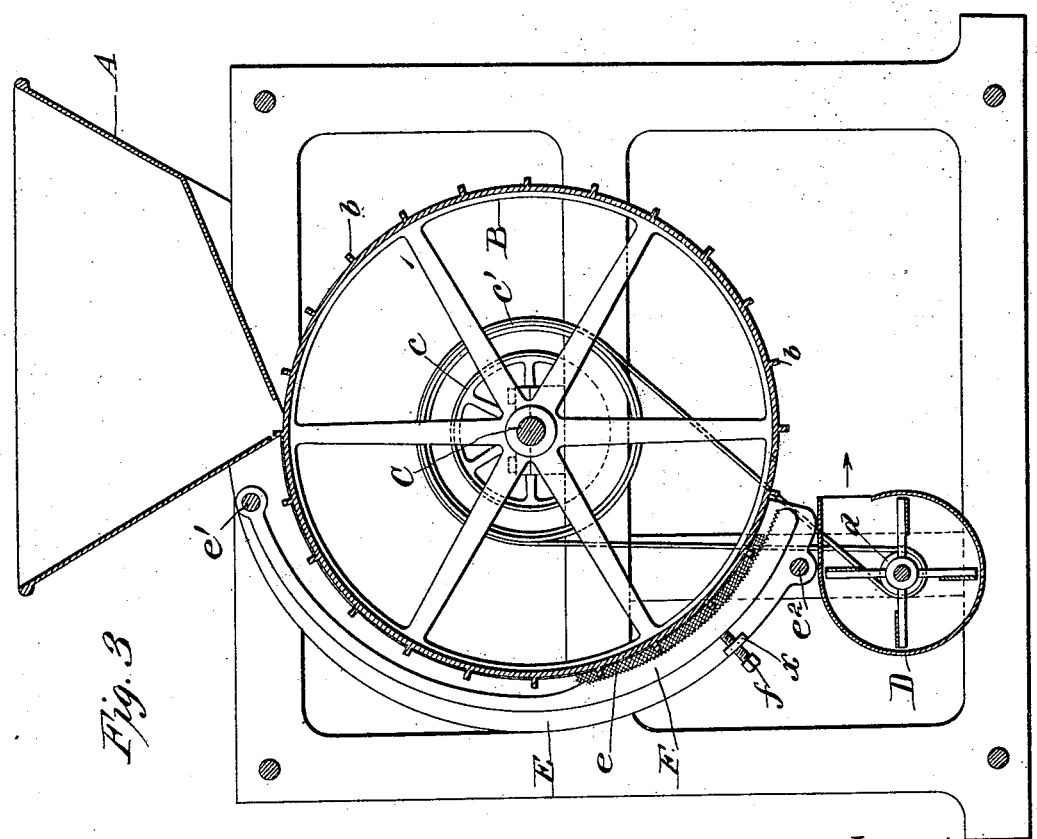
Witnesses:
Inventor

UNITED STATES PATENT OFFICE.

ADOLPHE H. HOPKINS, OF BROOKLYN, NEW YORK.

COFFEE-HULLING MACHINE.

SPECIFICATION forming part of Letters Patent No. 690,429, dated January 7, 1902.

Application filed September 7, 1900. Serial No. 29,326. (No model.)

*To all whom it may concern:*

Be it known that I, ADOLPHE H. HOPKINS, a citizen of the United States, residing in the borough of Brooklyn, in the city of New York, county and State of New York, have invented a certain new and useful Improvement in Coffee-Hulling Machines, of which the following is a specification.

The object of my invention is to provide a simple and effective machine for removing the skins or parchment covering of coffee-beans. It is well known that coffee grows in the form of a berry and that the beans are confined in a sack or skin, which in turn is surrounded by a pulpy substance. In extracting the beans the pulp is first removed and the skin or parchment covering is dried, whereupon the covering becomes brittle. This brittle covering is removed by a hulling-machine. Heretofore in such machines various arrangements of abrading, stripping, or grinding surfaces have been employed; but various objections exist to those machines, among others the grinding of the beans themselves, instead of merely stripping the covering from the bean. My improved machine overcomes this objection and the general construction and arrangement of my improved machine are much simpler than the machines heretofore employed, and the broken or worn parts can be much more readily replaced.

In carrying my invention into effect I provide a series of stripping-surfaces, between which the inclosed beans are fed by a drum provided with radially-projecting vanes, which feed the beans from a hopper in uniform quantities. These stripping-plates have fixed positions and form a channel, between which is hinged adjustable stripping-surfaces, so as to form a rectangular chamber through which the vanes of the feed-drum pass. As the beans and the broken coverings emerge from the stripping-channel a blower separates the same in a well-known manner.

My invention is illustrated in the accompanying drawings, in which—

Figure 2:
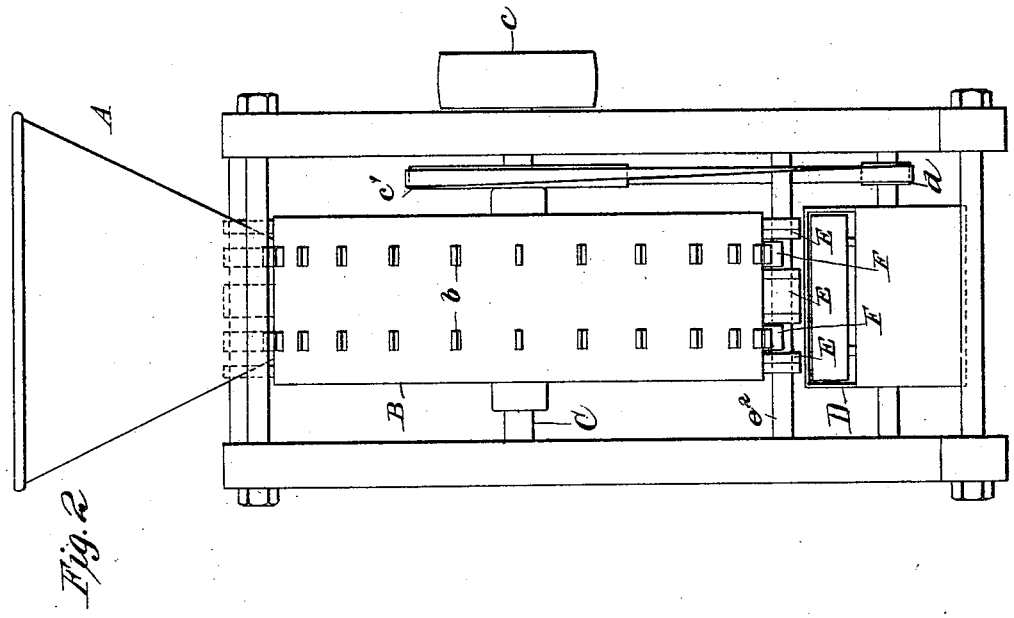
Figure 1:
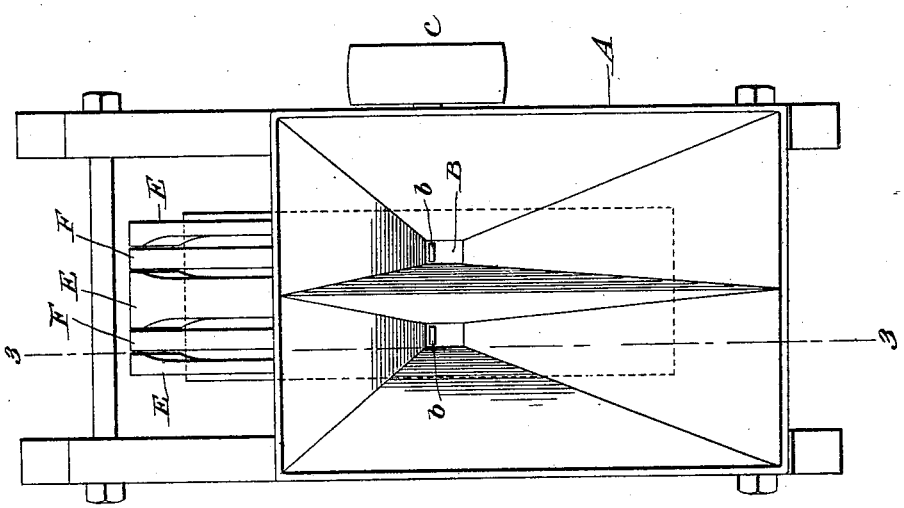

Figure 1 is a top plan view of a machine embodying my invention and provided with two stripping-chambers, with a corresponding set of feed-vanes. Fig. 2 is an end elevation. Fig. 3 is a vertical section taken on the line 3 3 of Fig. 1, and Figs. 4 and 5 are perspective views of the stripping elements.

Referring to the drawings, A is a hopper divided into as many compartments as there are sets of feed-vanes $b$ on the feed-drum B. The periphery of the drum is quite close to the opening in the bottom of the hopper, and vanes $b$ pass through openings of just sufficient width to admit the vanes, whereby only a certain quantity of beans will be carried forward between adjacent vanes, as will be readily understood. Drum B is carried by a shaft C, provided with a driving-pulley $c$. This shaft is also provided with a large pulley $c'$, which is belted to a small pulley $d$ on the shaft of a blower D, mounted in a suitable casing and having an opening directly under the exit of the stripping-channels, so that as the beans and skins drop from the stripping-channels the skins will be blown off and the beans will drop near the blower into a suitable receiving chamber or chute.

The side walls of the stripping-channel are made up of two curved stationary plates E, provided with removable stripping-surfaces $e$, so as to readily permit of renewal when worn. These stripping-surfaces face each other and are secured to the frame of the machine by rods $e'$ and $e^2$. Between each pair of stripping-plates E is an adjustable curved stripping-plate F, which is pivoted on rod $e'$ and which plate is adjustably held between the stripping-surfaces $e$ by adjustable screw $f$, the adjustment being toward and away from the surface of the drum B. The adjusting-screws may work through lugs $x$ on plates $e$, as shown, or the adjusting-screws may be arranged in any other convenient manner, it being understood that the stripping-plate F rests against the adjusting-screw by gravity, although this is not essential.

From the foregoing description it will be seen that this machine may be provided with any desired number of stripping-channels and a corresponding number of sets of feed-vanes and that the beans will be fed in uniform quantities from the hopper, and it will also be seen that since the stripping-surfaces are stationary the beans will not be forced against the stripping-surfaces with increased pressure, as is common in other forms of machines, and hence the skins only will be affected by the stripping-surfaces and the beans left intact.

The stripping-surface of plate F is not shown as a removable plate further than that the device may be removed from its pivot-rod. It will be understood, however, that a removable stripping-surface may be secured to the plate F. It will also be understood that while one drum B is shown for the two sets of feed-vanes b each set of vanes may be carried by a separate drum, so that each set of feed-vanes may be operated independently, if desired.

What I claim is—

1. In a coffee-hulling machine, the combination of two stationary stripping-plates facing each other, a rigid intermediate stripping-plate, said plates forming a stripping-channel, a feed-wheel having radially-projecting vanes entering the stripping-channel and whereby the berries are forced through the same in contact with the stripping-surfaces, and a hopper provided with a channel through which the vanes pass to feed the berries from the hopper to the stripping-channel in substantially uniform quantities, substantially as set forth.

2. In a coffee-hulling machine, the combination of two stationary stripping-plates facing each other, a rigid intermediate stripping-plate, said plates forming a stripping-channel, means for adjusting the position of said intermediate stripping-plate, a feed-wheel having radially-projecting vanes entering the stripping-channel and whereby the berries are forced through the same in contact with the stripping-surfaces, and a hopper provided with a channel through which the vanes pass to feed the berries from the hopper to the stripping-channel in substantially uniform quantities, substantially as set forth.

3. In a coffee-hulling machine, the combination of two or more pairs of stripping-plates, the stripping-surfaces of each pair facing each other, a rigid intermediate stripping-plate for each pair of strippers, each pair of strippers and the intermediate stripping-plate forming a stripping-channel, a feed wheel or wheels having a set of radially-projecting vanes entering each stripping-channel and whereby the berries are forced through the same in contact with the stripping-surfaces, and a hopper provided with channels through which the sets of feeding-vanes pass to feed the berries from the hopper to the stripping-channels in substantially uniform quantities, substantially as set forth.

4. In a coffee-hulling machine, the combination of two or more pairs of stripping-plates, the stripping-surface of each pair facing each other, a rigid intermediate stripping-plate for each pair of strippers, each pair of strippers and the intermediate stripping-plate forming a stripping-channel, means for independently adjusting the positions of said intermediate stripping-plates, a feed wheel or wheels having a set of radially-projecting vanes entering each stripping-channel and whereby the berries are forced through the same in contact with the stripping-surfaces, and a hopper provided with channels through which the sets of feeding-vanes pass to feed the berries from the hopper to the stripping-channels in substantially uniform quantities, substantially as set forth.

ADOLPHE H. HOPKINS.

Witnesses:
JAMES P. LOUGHLIN,
EUGENE CONRAN.